United States Patent

Price

[11] Patent Number: 5,201,564
[45] Date of Patent: Apr. 13, 1993

[54] SNAP-IN VISOR MOUNT

[75] Inventor: Rodger A. Price, Holland, Mich.

[73] Assignee: Prince Corporation, Holland, Mich.

[21] Appl. No.: 763,652

[22] Filed: Sep. 18, 1991

Related U.S. Application Data

[63] Continuation-in-part of Ser. No. 577,330, Sep. 4, 1990, Pat. No. 5,061,005, which is a continuation-in-part of Ser. No. 394,937, Aug. 16, 1989, Pat. No. 4,989,911.

[51] Int. Cl.⁵ .................................................. B60J 3/00
[52] U.S. Cl. .................................. 296/97.9; 296/97.12; 411/508; 411/913
[58] Field of Search ........................... 296/97.9, 97.12; 411/182, 508, 509, 913, 544

[56] References Cited

U.S. PATENT DOCUMENTS

| | | | |
|---|---|---|---|
| 3,221,572 | 12/1965 | Swick | 411/508 X |
| 3,842,709 | 10/1974 | Fuqua | 411/508 X |
| 4,377,020 | 3/1983 | Vigo | |
| 4,553,797 | 11/1985 | Marcus | |
| 4,569,552 | 2/1986 | Marks | |
| 4,634,196 | 1/1987 | Nestell | |
| 4,893,866 | 1/1990 | Dowd et al. | |
| 4,948,314 | 8/1990 | Kurosaki | 411/182 |
| 4,989,911 | 5/1991 | Van Order | |
| 5,031,953 | 7/1991 | Miller | 296/97.9 |
| 5,061,005 | 10/1991 | Van Order et al. | 296/97.9 |

FOREIGN PATENT DOCUMENTS

| | | |
|---|---|---|
| 7415154 | 4/1974 | Fed. Rep. of Germany . |
| 2341940 | 11/1977 | Fed. Rep. of Germany . |
| 2653988 | 6/1978 | Fed. Rep. of Germany ..... 296/97.9 |
| 26283 | 9/1979 | PCT Int'l Appl. . |

Primary Examiner—Charles A. Marmor
Assistant Examiner—Gary C. Hoge
Attorney, Agent, or Firm—Price, Heneveld, Cooper, DeWitt & Litton

[57] ABSTRACT

A mounting system for mounting a vehicle accessory such as a visor to a vehicle includes a mounting member for each visor and which includes a pair of opposed spaced support surfaces for compressibly engaging opposite sides of the vehicle sheet metal support structure when one of the support surfaces is extended through an aperture in the sheet metal support structure to lock the mounting member in place. A compression member extends between one of the support surfaces of the mounting member and the sheet metal vehicle support structure to prevent movement of the mounting member and visor attached thereto once installed.

24 Claims, 2 Drawing Sheets

SNAP-IN VISOR MOUNT

CROSS REFERENCE TO RELATED APPLICATIONS

This is a continuation-in-part application of U.S. patent application Ser. No. 07/577,330 filed Sep. 4, 1990 and entitled Snap-In Visor Mount (now U.S. Pat. No. 5,061,005) which is a continuation-in-part of U.S. patent application Ser. No. 07/394,937 filed Aug. 16, 1989, entitled Mounting Assembly (now U.S. Pat. No. 4,989,911), the disclosures of which are incorporated herein by reference.

BACKGROUND OF THE INVENTION

The present invention pertains to a mounting assembly and particularly one used for attaching the end of a visor pivot rod to a roof of a vehicle.

There exists a variety of manners in which vehicle visors are attached to the roof and/or headliner of a vehicle for subsequent attachment to the roof of a vehicle. Some attachment systems have employed mounting screws which extend through a conventional visor mounting bracket, the headliner and then directly into the sheet metal roof of the vehicle. However, systems are somewhat difficult to install quickly along the vehicle assembly line since they require some skill and dexterity. Thus a snap-in type construction is preferable from an ease and cost of manufacturing standpoint.

Previous efforts have been made to incorporate visors with headliners as a subassembly which is then subsequently snapped into the vehicle roof. The advantages of such construction are well known and include the ease of assembly of the interior headliner of the vehicle with the preassembled accessories mounted thereto. One system has employed a polymeric snap-in visor fastening system in which a polymeric mounting plate having a central split post with a pair of outwardly extending flanges. This plate was positioned on the upper side of a headliner which was sandwiched between the mounting plate and a conventional visor mounting bracket secured to the polymeric plate by screws, thus mounting the visor to the snap-in fastener. The visor and headliner to which they were mounted, snapped into the vehicle using the split post and flanges for holding the assembly within an aperture formed in the vehicle roof. It was discovered that, over a period of time, polymeric fasteners when under constant stress used in such an installation tend to flow or creep which loosens the visor assembly with respect to its mounting to the sheet metal roof of the vehicle. Also during the use of the visor, during which significant forces are focused at the pivot rod mounting location, loosening of the visor occurs.

The utilization of spring steel snap-in fastening systems such as disclosed in U.S. Pat. Nos. 4,569,552 and 4,989,911 overcomes the difficulties of polymeric-type snap-in fasteners. The fastener of the present invention also provides a spring steel snap-in fastener and one which optimizes the performance of the fastener system and accommodates for different tolerances in vehicle roof mounting locations. Further, the system of the present invention requires only a single sheet of roof material for securely attaching the headliner and visors mounted thereto to the vehicle roof.

SUMMARY OF THE PRESENT INVENTION

The system of the present invention provides an improved snap-in visor rod mounting assembly which includes a mounting member preferably made of spring steel and includes a first side which is proximate the underside of the vehicle roof supporting structure and support means which extends through an aperture in the roof and engages the upperside of the roof supporting structure. An anti-slip compression member is shaped to generally conform to the first side and is compressed between the underside of the vehicle roof structure and said first side when the mounting member is installed to the vehicle roof. A visor includes a mounting rod which is secured to the mounting member for movement of the visor between stored and use positions.

Such construction provides a relatively inexpensive mounting assembly which has maximum ability to securely hold a visor and headliner in position for an extended period of time in a secure fashion and provides ease of installation during assembly. These and other features, objects and advantages of the present invention, will become apparent upon reading the following description thereof together with reference to the accompanying drawings in which:

DETAILED DESCRIPTION OF THE PREFERRED EMBODIMENT

Figure 1:
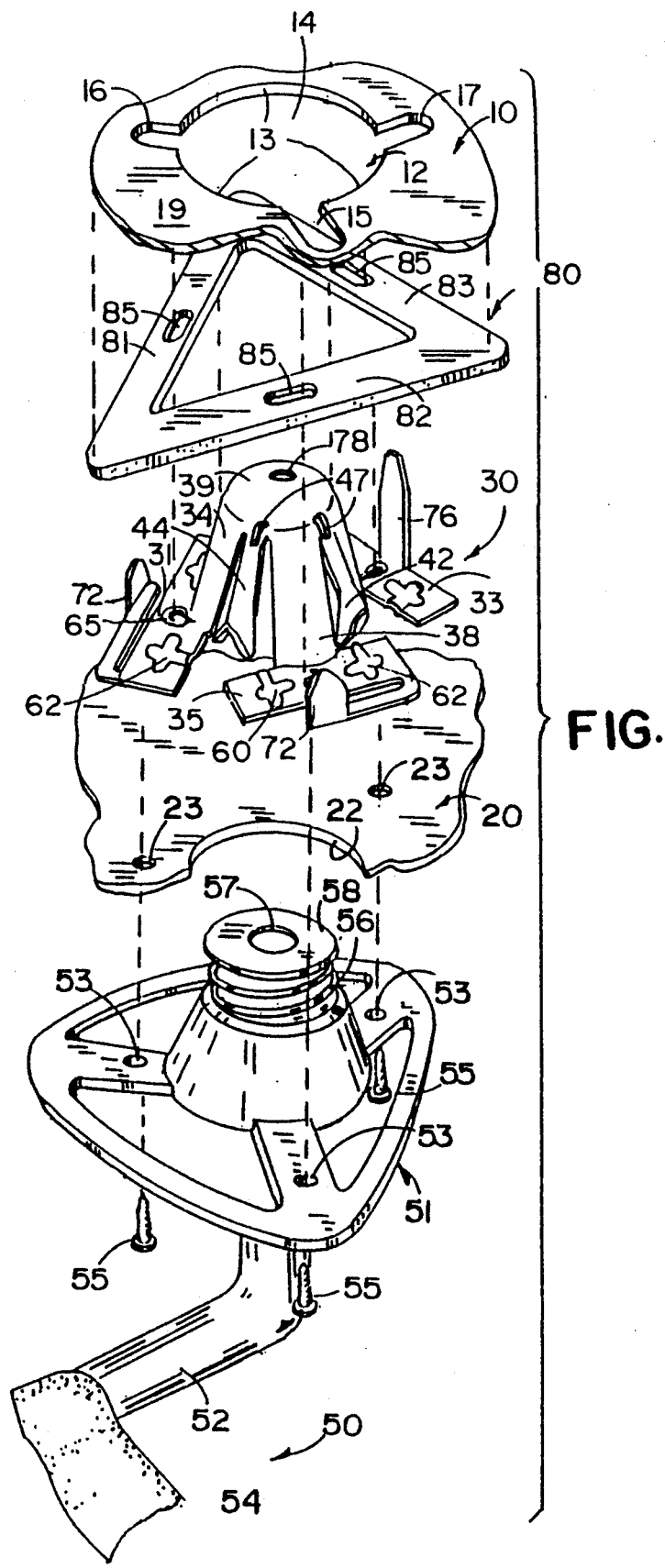
FIG. 1 is a fragmentary exploded perspective view of a vehicle visor, headliner and mounting system and a portion of the sheet metal vehicle roof incorporating the present invention.

Referring initially to FIG. 1 there is shown a section of a vehicle roof 10 having an aperture 12 formed therein. Aperture 12 is configured to lockably receive the mounting member 30 of the present invention which is shown in greater detail in FIG. 2 and described in detail in the parent application which is identified above and incorporated herein by reference. The vehicle includes a headliner 20 which can be made of conventional construction and include for example, a molded polymeric or other substrate to which a decorative fabric is integrally attached. Headliner 20 includes an aperture 22 (FIG. 1) for receiving the upwardly extending end of a visor pivot rod mounting bracket assembly 50 including a visor pivot rod 52 to which a vehicle visor 54 is mounted by means of a suitable torque fitting such as disclosed in U.S. Pat. No. 4,500,131. The visor can be of the construction of and may include accessories such as a covered illuminated vanity mirror as disclosed in U.S. Pat. No. 4,227,241.

The visor mounting bracket 50 is of generally conventional construction having a generally triangular configuration with corner apertures 53 which are spaced approximately 120° apart for receiving fastening screws 55 therethrough which extend through apertures 23 in the headliner into the mounting member 30 during preassembly of the visor assembly 50 to the headliner 20 and mounting member 30. It is to be understood that each of the visors in the vehicle include such a mounting arrangement and the mounting member 30 of the present invention may also be employed for mounting other vehicle accessories to the headliner 20 for subsequent snapping into the vehicle roof. The visor pivot rod 52 is mounted to the generally triangular-shaped bracket 51 by means of a conventional compression spring 56 which terminates in a washer 58 conventionally secured to the end 57 of the pivot rod such as by peening or rolling end 57. This holds the visor rod 52 to bracket 51 with a predetermined rotational torque such that the visor rod can pivot with respect to bracket 51 for moving the visor between a forward windshield position and a side window position as desired. This attachment of the visor pivot rot 52 to bracket 51 is conventional.

Figure 2:
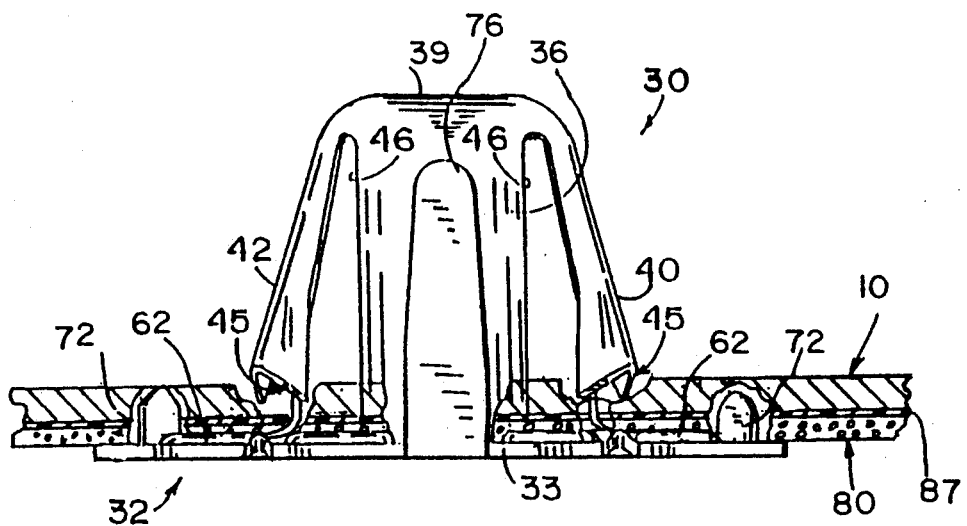
FIG. 2 is an enlarged right side elevational view of the mounting member and compression member shown in FIG. 1 and partly in cross-section showing its relationship to the supporting roof member.

The aperture 12 of the sheet metal roof 10 of the present invention includes a generally circular portion 14 with three outwardly and equally spaced notches 15, 16 and 17 which extend radially outwarldy from the center of circular aperture 14 and are spaced at 120° intervals. The edges of the arcuate sections 13 of the underside of the roof support sheet metal 10 between notches 15, 16 and 17 are engaged by the proximate first side of the mounting member 30 of the present invention through the anti-slip compression member 80 as best seen in FIG. 2. Member 30 includes means extending through aperture 12 in roof member 10 which engages the upper surface of the roof member, as described below, for snap-mounting the member 30, to which visor assembly 50 and headliner 20 is attached, to the sheet metal roof of the vehicle. The sheet metal roof area which includes aperture 12 may be the front header of the vehicle, either of the A-pillars, or other suitable structural member having a single layer of sheet metal sufficiently rigid to support the visors and headliner to which the visor and mounting member 30 are attached. Notches 15, 16 and 17 as described below serve anchor and locating functions for the snap-in fastener 30.

The mounting member 30 is integrally formed of a suitable spring steel material such as 1074 spring steel having a thickness of approximately 1/32 of an inch and is formed in a progressive die, heat treated and finished with anti-oxidation finish which can be a finishing treatment commonly used in the industry. Member 30 is a spider-like member with a central hub 39 having two sets of alternately staggered first and second downwardly and outwardly extending legs. A first set of legs includes legs 34, 36 and 38 which terminate in a segmented base section 32 which engages the lower surface of the compression member 80 as best seen in FIG. 2. Thus, the first side of mounting means for the embodiment shown is defined by the upper surface of the base section which is defined by three generally rectangular and equally spaced base segments 31, 33 and 35 integral with legs 34, 36 and 38 respectively. Legs 34, 36 and 38 like associated base segments 31, 33 and 35 are equally spaced in approximately 120° intervals around the periphery of the generally circular base construction so formed. Each of the arcuate legs 34, 36 and 38 in turn circumscribe an arc of approximately 70. The spider-like member 30 includes a second set of legs 40, 42 and 44 which are support legs and are integral with the legs 34, 36 and 38 in an alternately staggered relationship with the ends 45 of legs 40, 42 and 44 engaging the upper surface 19 of sheet metal roof 10. Legs 40, 42 and 44 extend downwardly from hub 39 at equally spaced 120° intervals between legs 34, 36 and 38 and terminate as seen in FIGS. 1 and 2 in a V-shaped inclined end 45 which are inclined inwardly and downwardly at an angle of approximately 45° in the preferred embodiment although other angles ranging from 30° to 60° may be employed.

Each of the legs 40, 42 and 44 are formed by slots 46 extending between each of the legs 34, 36 and 38 and are bent in the V-shape during the forming process. The utilization of the inverted V-shape provides two linear contact areas which can engage the upper edges 13 of the aperture 12 in sheet metal roof 10 at two spaced-apart locations between each of the slots 15, 16 and 17 to maximize the securing of member 30 in a snap-fit fashion within the aperture 12. Further, the bending of the legs 40, 42 and 44 provides additional rigidity and strength to the legs so formed.

At the upper ends of each of the legs where they are integrally joined with the hub 39 of member 30 there is provided an aperture 47 which allows resiliency of each of the legs for the initial installation by insertion through the circular portion 14 of aperture 12. Once they extend through the aperture they spring outwardly into a locking position as seen in FIG. 2.

Each of the base segments 31, 33 and 35 of legs 34, 36 and 38 respectively include raised upper patterned surfaces 60 and 62 formed on opposite ends thereof and which individually include elements which extend in orthogonal directions for providing a cross-shaped linear contact pattern against the lower surface of compression member 80 and in turn the lower surface of roof member 10. The utilization of reference surfaces 60 and 62 facilitate the tolerance control of the mounting of member 30 to the vehicle roof and provide precise control surfaces against which the ends 45 of the spring or support legs 40, 42 and 44 can operate to compressibly engage the sheet metal roof.

Each of the base segments 31, 33 and 35 also include integral thread forming raised apertures 65 centered in the legs and located between reference surfaces 60 and 62 for threadably receiving the fastening screws 55 which secure the visor mounting bracket 51 to the mounting member 30. Apertures 65 are formed by providing a generally circular center aperture with an outwardly extending notch and forming at the periphery of the aperture, an inclined spiral ramp to define an edge of the support reference plate which curves upwardly to define a thread-like aperture for receiving the fastening screws 55.

Extending outwardly and parallel to the longitudinal axis of base mounting segments 31 and 35 are anti-rotation tabs 72 which include upstanding curved tips. Base segment 33 includes an upwardly and inwardly inclined locator tab 76 which extends upwardly through slot 17 of aperture 12 in sheet metal roof support 10 to initially assist in aligning the support member 30 within the aperture 12 as the headlinier and visors attached thereto are installed in a vehicle. To assist in the die cutting and progressive stamping of the product, a tooling index aperture 78 is formed at the center of the hub 39 for providing a locating and indexing means for the part in the tool.

Figure 3:
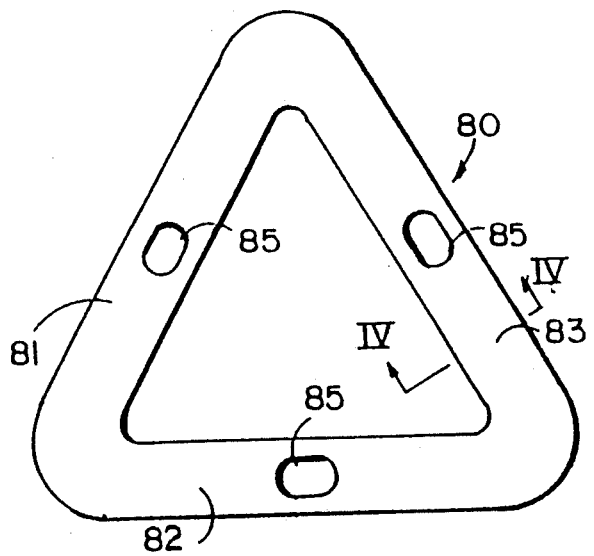
FIG. 3 is a plan view of the compression member shown also in FIGS. 1 and 2.
Figure 4:
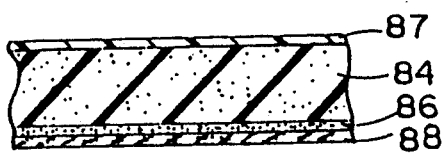
FIG. 4 is an enlarged fragmentary cross-sectional view of the compression member taken along section line IV—IV of FIG. 3.

The upper surface of mounting member 30 of the present invention is covered by an anti-slip compression member 80 as seen in FIGS. 1 and 2. Member 80 is preferably made of a polyurethane foam having a thickness of from 0.25–0.75 mm. In the preferred embodiment, the thickness employed was 0.5 mm and member 80 was generally triangular in shape as seen in FIG. 3. Member 80 is generally washer-shaped and includes three legs 81, 82, and 83 each with central apertures 85 which align with apertures 65 in member 30 for receiving screws 55. Member 80, as best seen in FIG. 4 includes a foam body 84 with an upper skin 87 which engages the lower surface of roof member 10 to prevent slipping or rotation or member 80 with respect to the roof. The lower side of body 84 includes a self-sticking adhesive layer 86 covered with a tear-away wax based paper 88 prior to installation. In the preferred embodiment the polyurethane employed was PORON® which has the desired compressibility and shear strength to further resist and prevent rotation or vertical movement of member 30 with respect to member 10 when installed.

Member 80 is die cut from stock material having the adhesive layer 86 and backing 88. During assembly, backing layer 88 is removed and member 80 is positioned over member 30 with the adhesive layer 86 sticking to the upper surface of the pads 31, 33, and 35 defining the first support surface of member 30. Member 30 is then assembled to the visor bracket 51 using screws 55 with the headlinier 20 sandwiched therebetween. The completed subassembly can then be readily inserted into the vehicle in an assembly line by pushing visor elbows 52 upwardly which compresses member 80 to allow edges 45 of arms 40, 42, and 44 to clear aperture 12 and lockably engage edges 13 of roof support 10. Such a system allows the easy snap-in assembly of the visors and headliners during installation in a vehicle, and yet allows the conventional removal of the visors utilizing the fastening screws without disturbing the secure mounting of the mounting member 30 to the roof. This allows a visor to be removed for repair or installation of a new visor without disturbing the mounting member 30.

Member 80 in the installed position is largely compressed between the first support surface of the mounting member, namely pads 31, 33, and 35; and the lower surface of roof member 10. This accommodates any possible slight gaps such as between the upper surface of the pads and the reference surfaces 60 and 62 as well as provides an anti-slip interface between the two metal surfaces the combined effect of which substantially prevents undesired movement of the visor mounting structure with movement of the visor during long term use. The anti-slip compression member 80 can be used successfully with other metallic or even polymeric snap-in visor mounts or other mounting systems where significant rotational and pulling forces tend to loosen snap-in fixtures. In such applications, it is possible to use the compression member on either side of the vehicle support member as long as the mounting member has a suitable support surface which can compress the member once installed. It will become apparent to those skilled in the art that various modifications to the preferred embodiment of the invention described herein can be made without departing from the spirit or scope thereof defined by the appended claims.

The embodiments of the invention in which an exclusive property or privilege is claimed are defined as follows:

1. A mounting system for the snap-in mounting of a vehicle visor within an aperture formed in a sheet metal support member of a vehicle roof comprising:

a mounting member having a first support surface facing one side of a vehicle support member when installed and support means for extending through an aperture in the vehicle support member for engagement with an opposite side of the vehicle support member, said system including visor bracket means for attaching a visor thereto; and an anti-rotation compression member having a substantially flat thin planar generally washer-shaped body having a central opening for receiving said support means therethrough, said washer-shaped body having aperture means for receiving fastening means therethrough for attaching said visor bracket means to said mounting member, said compression member extending between said mounting member and at least one side of said vehicle support member to be compressed between said mounting member and the vehicle support member once said mounting member is installed.

2. The apparatus as defined in claim 1 wherein said compression member is made of a foam polymeric material.

3. The apparatus as defined in claim 2 wherein said foam polymeric material is polyurethane having a surface skin.

4. The apparatus as defined in claim 1 wherein said compression member is a foam polymeric material having a thickness of from about 0.25 mm to about 0.75 mm.

5. The apparatus as defined in claim 4 wherein said foam polymeric material is polyurethane having a surface skin.

6. The apparatus as defined in claim 5 wherein said mounting member is made of steel.

7. A mounting system for the snap-in mounting of a vehicle visor within an aperture formed in a sheet metal support member of a vehicle roof comprising:

a mounting member having a first support surface facing one side of a vehicle support member when installed and support means for extending through an aperture in the vehicle support member for engagement with an opposite side of the vehicle support member, said mounting member including means for attaching a visor thereto; and an anti-rotation compression member having a substantially thin planar body, said compression member extending between said mounting member and at least one side of said vehicle support member to be compressed between said mounting member and the vehicle support member once said mounting member is installed, wherein said compression member is formed in a triangular shape to conform to said vehicle visor mounting member.

8. A visor mounting system for the snap-in mounting of a visor within an aperture formed in a sheet metal support member of a vehicle comprising:

a mounting member having a first support surface facing one side of a vehicle support member when installed and support means for extending through an aperture in the vehicle support member for engagement with an opposite side of the vehicle support member, said mounting member including means for attaching a vehicle accessory thereto;

a visor secured to said mounting member; and a substantially thin planar anti-rotation foam polymeric compression member having a thickness of from about 0.25 mm to about 0.75 mm extending between said mounting member and at least one side of said vehicle support member to be compressed between said mounting member and the vehicle support member once said mounting member is installed, wherein said foam polymeric material is polyurethene having a surface skin, and wherein said compression member is formed in a triangular shape to conform to said vehicle visor mounting member.

9. A mounting system for the snap-in mounting of a vehicle visor within an aperture formed in the roof of a vehicle comprising:
   a mounting member having a first support surface defining a generally triangular shape and facing a roof support member when installed and support means for engagement with an upper side of a vehicle roof support member;
   means for attaching a vehicle visor to said mounting member; and
   a thin triangular anti-rotation compression member extending over said first support surface to be compressed between said mounting member and the vehicle roof once said mounting member is installed.

10. The apparatus as defined in claim 9 wherein said compression member is made of a foam polymeric material.

11. The apparatus as defined in claim 10 wherein said foam polymeric material is polyurethane having a surface skin.

12. The apparatus as defined in claim 9 wherein said compression member is a foam polymeric material having a thickness of from about 0.25 mm to about 0.75 mm.

13. The apparatus as defined in claim 12 wherein said foam polymeric material is polyurethane having a surface skin.

14. The apparatus as defined in claim 13 wherein said mounting member is spider-like and has a center hub and a plurality of alternately staggered legs extending downwardly and outwardly from said hub and in which first ones of said legs each terminate in a mounting base defining said first support surface and second ones of said legs terminate in ends which define said support means and grip the upper side of a vehicle roof.

15. The apparatus as defined in claim 14 wherein said ends of said second legs are inclined to engage an edge of a vehicle roof at an angle.

16. The apparatus as defined in claim 15 wherein said ends of said second legs are generally V-shaped to provide multiple contact points with the edge of the vehicle roof.

17. The apparatus as defined in claim 16 wherein said spider-like member is integrally formed of spring steel.

18. The apparatus as defined in claim 17 wherein said V-shaped ends of said second legs are formed by bending said ends of said legs.

19. The apparatus as defined in claim 18 wherein said mounting base at the end of each of said first legs include aperture means for receiving fasteners for attaching a visor bracket to said mounting member.

20. The apparatus as defined in claim 19 wherein said mounting base of each of said first legs includes a raised reference surface for accurately positioning said mounting member against the vehicle roof.

21. The apparatus as defined in claim 20 wherein at least one of said mounting bases includes an upwardly extending indexing tab for locating said mounting member with respect to an aperture in the vehicle roof.

22. The apparatus as defined in claim 21 wherein said aperture formed in each of said mounting bases includes a radially extending slot and an inclined peripheral edge to define a threaded aperture.

23. The apparatus as defined in claim 22 wherein each of said mounting bases is generally rectangular with said aperture centrally located therein and wherein each of said mounting bases include a pair of reference surfaces positioned on either side of said aperture.

24. The apparatus as defined in claim 23 wherein said ends of said second legs are inclined at an angle of from about 30° to about 60° to provide contact positions which vary to accommodate tolerance variations in the vehicle roof.

* * * * *